US009353209B2

(12) United States Patent
Greszta-Franz et al.

(10) Patent No.: US 9,353,209 B2
(45) Date of Patent: May 31, 2016

(54) LIGHTFAST POLYURETHANE COMPOSITIONS

(71) Applicant: Bayer MaterialScience AG, Monheim (DE)

(72) Inventors: Dorota Greszta-Franz, Solingen (DE); Jens Krause, Leverkusen (DE); Hans-Josef Laas, Odenthal (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 14/396,107

(22) PCT Filed: Apr. 22, 2013

(86) PCT No.: PCT/EP2013/058260
§ 371 (c)(1),
(2) Date: Oct. 22, 2014

(87) PCT Pub. No.: WO2013/160227
PCT Pub. Date: Oct. 31, 2013

(65) Prior Publication Data
US 2015/0119546 A1    Apr. 30, 2015

(30) Foreign Application Priority Data

Apr. 23, 2012  (EP) .................................. 12165170

(51) Int. Cl.
| | |
|---|---|
| C08G 18/00 | (2006.01) |
| C08G 18/38 | (2006.01) |
| C08G 18/72 | (2006.01) |
| C08G 18/73 | (2006.01) |
| C08G 18/75 | (2006.01) |
| C08G 18/78 | (2006.01) |
| C08G 18/79 | (2006.01) |
| C08L 75/04 | (2006.01) |
| G02B 1/04 | (2006.01) |

(52) U.S. Cl.
CPC ........ *C08G 18/3876* (2013.01); *C08G 18/3857* (2013.01); *C08G 18/3863* (2013.01); *C08G 18/3868* (2013.01); *C08G 18/722* (2013.01); *C08G 18/725* (2013.01); *C08G 18/73* (2013.01); *C08G 18/755* (2013.01); *C08G 18/7831* (2013.01); *C08G 18/7887* (2013.01); *C08G 18/792* (2013.01); *C08L 75/04* (2013.01); *G02B 1/04* (2013.01); *G02B 1/041* (2013.01)

(58) Field of Classification Search
CPC ........... C08G 18/3868; C08G 18/3876; C08G 18/3857; C08G 18/3863; C08G 18/792; C08G 18/722
See application file for complete search history.

(56) References Cited

U.S. PATENT DOCUMENTS

| | | | |
|---|---|---|---|
| 4,288,586 A | 9/1981 | Bock et al. | |
| 4,419,513 A * | 12/1983 | Breidenbach et al. | ........ 544/222 |
| 4,454,317 A | 6/1984 | Disteldorf et al. | |
| 4,680,369 A | 7/1987 | Kajimoto et al. | |
| 4,689,387 A | 8/1987 | Kajimoto et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,076,958 A | 12/1991 | Pedain et al. | |
| 5,310,847 A | 5/1994 | Yean et al. | |
| 5,693,738 A * | 12/1997 | Okazaki et al. | .................. 528/51 |
| 6,107,484 A | 8/2000 | Richter et al. | |
| 6,765,111 B1 | 7/2004 | Pedain et al. | |
| 2006/0057394 A1 | 3/2006 | Cork | |
| 2006/0270771 A1 | 11/2006 | Droger et al. | |
| 2008/0090989 A1* | 4/2008 | Lesartre ............... | C08G 18/791 528/65 |
| 2011/0281965 A1* | 11/2011 | Laas .................... | C08G 18/022 521/137 |

FOREIGN PATENT DOCUMENTS

| | | |
|---|---|---|
| DE | 1670666 A1 | 7/1971 |
| DE | 2644684 A1 | 4/1978 |
| DE | 3700209 A1 | 7/1988 |
| DE | 3900053 A1 | 7/1990 |
| DE | 19914884 A1 | 10/2000 |

(Continued)

OTHER PUBLICATIONS

English translation of International Preliminary Report on Patentability and Written Opinion for PCT/EP2013/058260 mailed Oct. 28, 2014.

(Continued)

*Primary Examiner* — Michael L Leonard
(74) *Attorney, Agent, or Firm* — Drinker Biddle & Reath LLP

(57) ABSTRACT

The present invention relates to a composition comprising 10 to 50 wt.-% of at least one polyisocyanate a-1) based on hexamethylene diisocyanat, comprising at least one oligomeric polyisocyanate based on hexamethylene diisocyanate and optionally monomeric hexamethylene diisocyanate and 50 to 90 wt.-% of at least one polyisocyanate a-2) based on isophorone diisocyanate, comprising at least one oligomeric polyisocyanate based on isophorone diisocyanate and optionally monomeric isophorone diisocyanate, with the proviso that at least one of the components a-1) and a-2) additionally comprises monomeric isocyanate of the named kind, as well as at least one sulfur-containing component. It has been shown that the above mentioned mixture of the specific isocyanate group containing components improves the thermal and mechanical properties of a cured composition. Thus prepared molded articles are particularly suitable for the preparation of spectacle lenses, inter alia due to these properties.

15 Claims, No Drawings

(56) References Cited

FOREIGN PATENT DOCUMENTS

| | | |
|---|---|---|
| EP | 0003765 A1 | 9/1979 |
| EP | 0017998 A1 | 10/1980 |
| EP | 0235743 A1 | 9/1987 |
| EP | 0268896 A2 | 6/1988 |
| EP | 0271839 A2 | 6/1988 |
| EP | 0330966 A2 | 9/1989 |
| EP | 0336205 A2 | 10/1989 |
| EP | 0339396 A1 | 11/1989 |
| EP | 0408459 A1 | 1/1991 |
| EP | 0422836 A2 | 4/1991 |
| EP | 0506315 A2 | 9/1992 |
| EP | 0586091 A2 | 3/1994 |
| EP | 0802431 A2 | 10/1997 |
| EP | 0803743 A2 | 10/1997 |
| EP | 962455 A1 | 12/1999 |
| EP | 1637553 A1 | 3/2006 |
| EP | 1640394 A1 | 3/2006 |
| EP | 1657267 A1 | 5/2006 |
| EP | 1670852 A1 | 6/2006 |
| EP | 1878758 A1 | 1/2008 |
| EP | 2065415 A1 | 6/2009 |
| GB | 1145952 A | 3/1969 |
| WO | WO-02098942 A1 | 12/2002 |
| WO | WO-2009006034 A1 | 1/2009 |
| WO | WO-2010095837 A2 | 8/2010 |
| WO | WO-2010128770 A2 | 11/2010 |
| WO | WO-2010148424 A1 | 12/2010 |

OTHER PUBLICATIONS

International Search Report for PCT/EP2013/058260 mailed Aug. 9, 2013.

* cited by examiner

LIGHTFAST POLYURETHANE COMPOSITIONS

CROSS-REFERENCE TO RELATED APPLICATIONS

This application is a national stage application (under 35 U.S.C. §371) of PCT/EP2013/058260, filed Apr. 22, 2013, which claims benefit of European Application No. 12165170.7, filed Apr. 23, 2012, both of which are incorporated herein by reference in their entirety.

The invention relates to compositions which can be cured to light resistant polythiourethanes and which are particularly suitable for the preparation of optical lenses.

Today in multiple areas transparent plastics replace glass in the manufacture of optical components. Even with spectacle lenses polymeric materials are advantageous with respect to their lower weight, higher breaking strength and easy processability, and thus more and more substitute the traditionally used mineral glass.

The industrial production of organic eyeglasses from thermoset plastics takes place in a special casting process, wherein liquid reaction mixtures are mixed with additives such as e.g. UV-absorbers, filled into glass molds at temperatures which are as far as possible below their curing temperature and are subsequently cured for many hours in an exactly tempered process.

Transparent polymers with high refractive index in the range of 1.60 are of particular interest for preparing spectacle lenses. Such materials allow the preparation of thin and thus aesthetic, light glasses, even for the correction of stronger forms of ametropia.

Highly refractive polyurethanes and polythiourethanes, which are suitable as lens materials, have already been widely described.

For example, from U.S. Pat. No. 4,680,369 and U.S. Pat. No. 4,689,387 polyurethanes and polythiourethanes, respectively, are well known, wherein in their preparation process special sulphur-containing polyols or mercapto-functional aliphatic compounds with monomeric araliphatic diisocyanates, such as for example 1,3-bis(isocyanatomethyl)benzol (m-xylenediisocyanate, m-XDI), 1,4-bis(isocyanatomethyl)benzol (p-xylenediisocyanate, p-XDI), 1,3-bis(2-isocyanatopropane-2-yl)benzol or (m-tetramethylxylylenediisocyanate, m-TMXDI), respectively, are combined to achieve particularly high refractive indices.

Monomeric araliphatic diisocyanates, such as m- and p-XDI or m-TMXDI, are further described as the preferred cross-linker components for polyols and/or polythiols in the preparation of high refractive lens materials in multiple publications, such as for example in EP-A 0 235 743, EP-A 0 268 896, EP-A 0 271 839, EP-A 0 408 459, EP-A 0 506 315, EP-A 0 586 091 and EP-A 0 803 743.

Due to their aromatic structure-elements such diisocyanates lead to polyurethanes and polythiourethanes, respectively, with the desired high refractive indices in the range of ≥1.60, but at the same time the optical dispersion increases significantly, so that usually Abbe-numbers of below 40 are found. For optical applications of highest quality such materials based on araliphatic diisocyanates are thus less suitable.

With respect to this, much better results are achieved with combinations of aliphatic and cycloaliphatic polyisocyanates, respectively, with polythioles.

EP-A 0 802 431 for example describes a special process for preparing polyurethane lenses, wherein polythiol mixtures are reacted with a set of different polyisocyanate components, including araliphatic as well as cycloaliphatic polyisocyanates. The examples of this publication show, that by using the araliphatic diisocyanates m-XDI lenses with very high refractive indices of 1.64 or 1.65 but very low Abbe-numbers of 34 or 35 are obtained, whereas the use of cycloaliphatic diisocyanates bis(isocyanatomethyl)cyclohexane (H6XDI) or 1-isocyanato-3,3,5-trimethyl-5-isocyanatomethylcyclohexane (isophorone diisocyanate, IPDI) leads to transparent polythiourethanes with refractive indices of 1.60 and high Abbe-numbers of 42 or 43.

The particular suitability of cycloaliphatic polyisocyanates for preparing transparent high refractive polyurethanes and polythiourethanes with low dispersion is substantiated by a set of further publications (for example EP-A 0 422 836, EP-A 1 670 852, EP-A 2 065 415, WO 2010/095837, WO 2010/128770 or WO 2010/148424).

All these processes for preparing transparent polyurethanes and polythiourethanes share the disadvantage that exclusively monomeric diisocyanate can be used as the polyisocyanate component. When using only difunctional cross-linker molecules this leads to a comparably low cross-linking density in the cured polymer and thus only to poor mechanical and thermal strength, for example a low tensile strength and a relatively low glass transition temperature (Tg) and heat resistance (HDT).

EP-A 1 637 553 describes the process for preparing polythiourethanes with refractive indices of ≥1.60 and Abbe-numbers in the range of 40 from special polythioles with dithian matrix, wherein the linear aliphatic polyisocyanurate polyisocyanate, for example such based on hexamethylene diisocyanate (HDI), if applicable in mixture with further cycloaliphatic diisocyanates as crosslinking components, are used. Nevertheless, named polythiol components are not commercially available.

According to EP-A 1 878 758 high refractive lens material of low dispersion with good colorability and impact strength can be prepared by reacting special polyisocyanate combinations, comprising bicyclic diisocyanates, as for example 2,5 (6)-bis(isocyanatomethyl)-bicyclo[2.2.1]heptane, (norbornandiisocyanate, NBDI), and/or H6XDI and at the same time linear aliphatic diisocyanates, with at least one optionally polysuifide-structures comprising polythiol and at least one at least difunctional polyalcohol and/or mercaptoalcohol. The bicyclic diisocyanates, such as NBDI but as well the isomers of H6XDI, which are used as component in the cross-linking component, are raw materials of specialized nature which are accordingly expensive and not commercially available in any desired amount.

Even if in the literature the use of mixtures of different diisocyanates, particularly pre-polymers of different diisocyanates, has already been tested in relation to polythioruethane coatings, such as for example in DE 199 14 884 A1, and to poly(thio)urethane coatings, such as for example in WO 02/0989412 A1, WO 2009/006034 A1 and US 2006/0057394 A1, the suitability of such isocyanate structures cannot readily be transferred to molded articles. Particularly from such literature it cannot be concluded whether these systems fulfill the described high requirements in optical applications of molded articles, too.

So far no suitable polymers with high refractive index are known, which fulfill all mentioned requirements for the processing industry for preparing spectacle lenses.

Therefore, there was a strong interest to provide a plastic which has the advantages of plastics compared to mineral glass while having only low optical dispersion and a refractive index in the range of 1.60 and at the same time having very good mechanical and thermal properties. In addition the resulting plastics should particularly have a high impact strength and heat resistance. In addition, the obtained plastics should be light resistant and stable to yellowing. Furthermore, the plastic should be able to block UV-radiation particularly at a wavelength of <400 nm completely, if applicable by adding further auxiliaries and/or additives. The plastic should thus be particularly suitable for the use in optical applications such as optical lenses. The plastic should thus particularly be suitable for use as spectacle lenses. In addition the raw materials for such plastics should be well available in commercial scale. Further, these raw materials should preferably have sufficiently low viscosity to be applicable in a casting process. Therewith such a plastic could be used particularly in such casting processes as established in the spectacle lens industry.

These objects have been solved by providing the composition as described below in more detail, its use as well as the process for preparing transparent materials.

The composition according to the present invention comprises

A) 10 to 50 wt.-% of at least one polyisocyanate a-1) based on hexamethylene diisocyanate, comprising at least one oligomeric polyisocyanate based on hexamethylene diisocyanate and optionally monomeric hexamethylene diisocyanate and 50 to 90 wt.-% of at least one polyisocyanate a-2) based on isophorone diisocyanate, comprising at least one oligomeric polyisocyanate based on isophorone diisocyanate and optionally monomeric isophorone diisocyanate, with the proviso that, the polyisocyanate a-1) comprises monomeric hexamethylene diisocyanate, or the polyisocyanate a-2) comprises monomeric isophorone diisocyanate, or the polyisocyanate a-1) comprises monomeric hexamethylene diisocyanate and the polyisocyanate a-2) comprises monomeric isophorone diisocyanate wherein the %-data relate to the sum of components a-1) and a-2), B) at least one sulfur-containing component, and optionally C) one or more auxiliaries and/or additives.

It has surprisingly been found that by using well defined mixtures of at least one polyisocyanate based on hexamethylene diisocyanate (HDI), comprising at least one oligomeric polyisocyanate based on HDI and optionally monomeric HDI, and a polyisocyanate component based on isophorone diisocyanate (IPDI), comprising at least one oligomeric polyisocyanate based on IPDI and optionally monomeric IPDI, wherein the polyisocyanate a-1) comprises monomeric HDI and/or the polyisocyanate a-2) comprises monomeric IPDI, in combination with a sulphur-containing component, light resistant, transparent plastics can be obtained, which have the advantages of plastics compared to mineral glass while having only low optical dispersion and the refractive index in the range of 1.60 and at the same time having good mechanical and thermal properties. These plastics particularly have a lower density, a higher breaking strength and are easier processable, compared to glass. In particular they have a refractive index in the range of 1.60. In addition, high Abbe-numbers can be realized. Further, the plastics have very high heat resistance. Furthermore, the obtained plastics are light resistant and resistant to yellowing. Furthermore the obtained plastic is suitable to completely block UV-radiation particularly in a wavelength of <400 nm, by adding further auxiliaries and/or additives.

These optical, mechanical and thermal properties are the reason that the plastic according to the present invention is suitable for the use in optical applications such as optical lenses. In particular the plastic is suitable for the use as spectacle lenses.

At the same time, the starting components have a low viscosity, so that the composition according to the present invention can be used in a casting process. In particular the use of this composition can be achieved in casting processes as established in the spectacle lens industry.

Component A)

The component A) of the composition of the present invention comprises 10 to 50 wt.-%, preferably 10 to 45 wt.-%, more preferably 15 to 35 wt.-%, even more preferred 20 to 30 wt.-%, of at least one polyisocyanate a-1) based on HDI and optionally monomeric HDI, and 50 to 90 wt.-%, preferably 55 to 90 wt.-%, more preferably 65 to 85 wt.-%, even more preferred 70 to 80 wt.-%, of at least one polyisocyanate a-2) based on IPDI comprising at least one oligomeric polyisocyanate based on IPDI and optionally monomeric IPDI, with the proviso that the polyisocyanate a-1) comprises monomeric hexamethylene diisocyanate, or that the polyisocyanate a-2) comprises monomeric isophorone diisocyanate, or that the polyisocyanate a-1) comprises monomeric hexamethylene diisocyanate and the polyisocyanate a-2) comprises monomeric isophorone diisocyanate and wherein the %-data relate to the sum of components a-1) and a-2).

The term polyisocyanate is generally understood to mean a chemical compound which has two or more isocyanate groups. Therefore diisocyanates such as HDI or IPDI are commonly referred to as polyisocyanates, too, since they carry more than one isocyanate group. However, in general, in the field of aliphatic or cycloaliphatic polyisocyanates, respectively, monomeric diisocyanates such as HDI and IPDI are not yet designated as polyisocyanates, but the higher molecular oligomeric polyisocyanates which are prepared therefrom by using suitable modification reactions, such as e.g. trimerization or biuretizing. Therein HDI and IPDI are the starting diisocyanates for preparing the corresponding polyisocyanates. Therefore, in the present patent application the term polyisocyanate is particularly used to designate an oligomeric polyisocyanate.

Oligomeric polyisocyanates are particularly such polyisocyanates in which at least two generally equal diisocyanate units are bond to each other by reacting a part of the isocyanate groups, optionally by adding for example monohydric or polyhydric alcohols. Particularly preferably oligomeric polyisocyanates are dimers, trimers or mixtures of dimers and trimers of a diisocyanate. This particularly means that the oligomeric polyisocyanates have a higher molecular weight than the corresponding diisocyanates. An oligomeric polyisocyanate based on HDI does preferably have a molecular weight higher than 168.20 g/mol. An oligomeric polyisocyanate based on IPDI does preferably have a molecular weight higher than 222.29 g/mol. In the sense of the present invention it is particularly preferred that the oligomeric polyisocyanates are obtained by reacting only one type of diisocyanate (i.e. either only HDI or only IPDI) as the diisocyanate unit. It is also preferred that the oligomeric polyisocyanates are no prepolymers. In particular this means that the molecular weight of the oligomeric polyisocyanates or polydiisocyanates obtained by reacting only one sort of diisocyanate as diisocyanate unit is below 1500 g/mol.

Depending on the nature of the used reaction conditions different links of the diisocyanate units can occur. Furthermore the oligomeric polyisocyanates also include the reaction products of diisocyanates with preferably low molecular weight polyols (urethanes). Such polyols preferably have a molecular weight range of 62 to 400 g/mol.

Preferred is the formation of uretdion-, isocyanurate-, iminooxadiazindion-, urethane-, allophanate-, biuret- and/or oxadiazintrion groups. In the following oligomeric polyisocyanates which have at least one of the named groups are also sometimes referred to as "derivatives" of the corresponding diisocyanates.

In general in the synthesis the oligomeric polyisocyanates do not occur in the form of defined compounds but as mixtures of different oligomers which have a molecular weight distribution. The oligomeric polyisocyanates particularly include the following types of structures (see also: Nachrichten aus der Chemie (News from Chemistry), 55, 380-384, 2007):

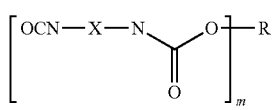

urethane

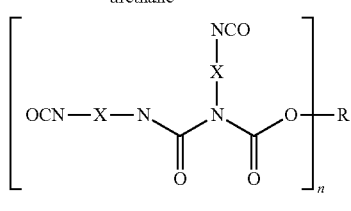

allophanate

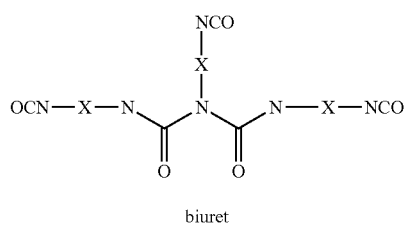

biuret

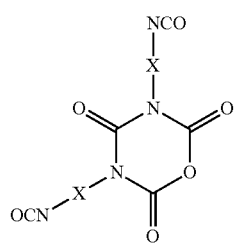

oxadiazintrion

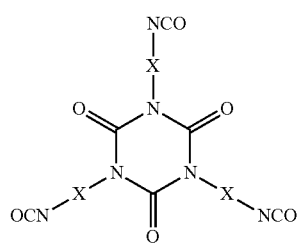

isocyanurate

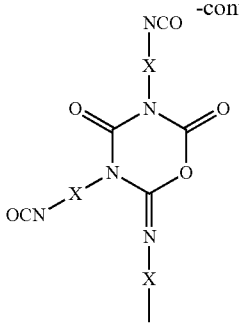

iminooxadiazindion

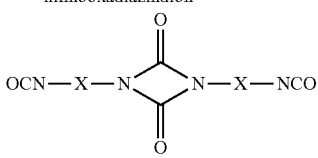

uretdion wherein X particularly has the following meaning:

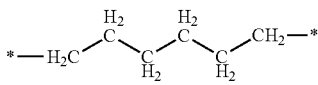

when it is an oligomeric polyisocyanate based on HDI or

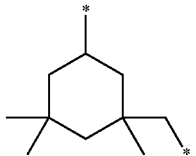 [SMILES: *CC1(C)CC(*)CC(C)(C)C1]

when it is an oligomeric polyisocyanate based on IPDI;
R can be any organic radical,
n is an integer between 1 and 10, preferably 2 or 3
and m is an integer between 2 and 10, preferably 2 or 3,
and mixtures of these types of structures.

The oligomeric polyisocyanates have at least two, particularly preferred at least three isocyanate groups per molecule (NCO-functionality).

Oligomeric Polyisocyanate Component a-1)

The polyisocyanate component a-1) based on HDI comprises at least one oligomeric polyisocyanate based on HDI and optionally monomeric HDI.

Relating to the polyisocyanate component a-1) based on HDI the term "comprising" is preferably understood to refer to "consist essentially of". This means that the polyisocyanate component a-1) based on HDI particularly preferably consist essentially of monomeric HDI and at least one oligomeric polyisocyanate based on HDI. Therein the polyisocyanate component a-1) based in HDI may include small amounts of usual impurities, which for example may often occur during the manufacturing of HDI and/or in the manufacturing of oligomeric polyisocyanates based on HDI.

In a preferred embodiment of the present invention the polyisocyanate component a-1) based on HDI is an oligomeric polyisocyanate based on HDI this means that in this embodiment if preferably comprises an amount of monomeric HDI of less than 0.5 wt.-% Relating to the total polyisocyanate component a-1) based on HDI.

The oligomeric polyisocyanates based on HDI are preferably the known derivatives of HDIs, which are selected from the group consisting of uretdion-, isocyanurate-, iminooxadiazindion-, urethane-, allophanate-, biuret-, oxaziazintrion groups comprising derivatives and mixtures of such derivatives. These derivatives and their manufacturing processes are exemplified in Laas et al., J. Prakt. Chem. 336, 1994, 185-200, DE-A 1 670 666, DE-A 3 700 209, DE-A 3 900 053, EP-A 0 330 966, EP-A 0 336 205, EP-A 0 339 396 and EP-A 0 798 299. Preferred are oligomeric polyisocyanate components based on HDI in the form of derivatives of the HDI, having biuret-, isocyanurate- and/or iminooxadiazindion structures. Particularly preferred are oligomeric polyisocyanates based on HDI in the form of derivatives of the HDI, having isocyanurate groups and/or iminooxadiazindion groups.

The HDI used for preparing the oligomeric polyisocyanate is preferably prepared by phosgenation of hexamethylenediamine. It is further possible to use HDI for the preparation of oligomeric polyisocyanate, which has been prepared by thermal cleavage of the urethane bonds of diurethanes of the HDI, which have been obtained from the phosgene free route.

Regardless of the type of the above described kind of chosen oligmerization reaction in this embodiment the preparation of the polyisocyanate components a-1) HDI, used according to the present invention, can be carried out as follows:

Preparation 1: After oligomerization is completed it can preferably be abstained from separating unreacted monomeric HDIs. Therewith it is possible to obtain the polyisocyanate a-1), comprising at least one oligomeric polyisocyanate based on HDI and monomeric HDI. This is a preferred approach. This allows preparation of the polyisocyanate component a-1) based in HDI in one process step.

Preparation 2: In an alternative approach the preparation of the polyisocyanate component a-1) based on HDI is carried out by preparing at least one oligomeric polyisocyanate based on HDI preferably according to the above described known process. The obtained at least one oligomeric polyisocyanate based on HDI is purified by conventional procedures, so that it is essentially low monomeric. It can be dissolved in monomeric HDI to obtain the polyisocyanate component a-1) based on HDI. However, this approach is not preferred because it is more complex than the process described previously.

The polyisocyanate component a-1) based on HDI preferably has a viscosity of 100 to 3500 mPa·s, preferably 600 to 3000 mPa·s, more preferably 600 to 1500 mPa·s at 23° C. The amount of isocyanate groups of the oligomeric polyisocyanate component a-1) based on HDI is preferably 20 to 24 wt.-%, more preferably 21 to 24 wt.-%, even more preferred 22 to 24 wt.-%. The polyisocyanate component a-1) based on HDI has an average isocyanate functionality per molecule of at least 2.0.

Particularly preferably the oligomeric polyisocyanates of component a-1) are a derivative of the HDI, having isocyanurate groups and/or iminooxadiazindion groups, with a viscosity of 600 to 1500 mPa·s at 23° C. and an amount of isocyanate groups of 22 to 24 wt.-%.

Polyisocyanate Component a-2)

The polyisocyanate component a-2) based on IPDI comprises at least one oligomeric polyisocyanate based on IPDI and optionally monomeric IPDI.

Relating to the polyisocyanate component a-2) based on IPDI the term "comprising" is preferably understood to refer to "consist essentially of". This means that the polyisocyanate component a-2) based on IPDI particularly preferably consist essentially of monomeric IPDI and at least one oligomeric polyisocyanate based on IPDI. Therein the polyisocyanate component a-2) based in IPDI may include small amounts of usual impurities, which for example may often occur during the manufacturing of IPDI and/or in the manufacturing of oligomeric polyisocyanates based on IPDI.

The oligomeric polyisocyanate based on IPDI preferably is a derivative, selected from the group consisting of derivatives with biuret-, isocyanurate structures and mixtures thereof.

The preparation of these polyisocyanate components a-2) based on IPDI may particularly be carried out by starting from monomeric IPDI using per se known methods for biuretizing and/or trimerization by reacting a part of the originally present isocyanate groups in the IPDI by forming oligomeric polyisocyanate molecules.

Common suitable methods for catalytic trimerization of isocyanates for forming isocyanurate structures or for biuretizing diisocyanates are exemplified for example in Laas et al., J. Prakt. Chem. 336, 1994, 185-200. Additional descriptions of suitable IPDI-polyisocyanates can be found for example in EP-A 0 003 765, EP-A 0 017 998 and DE-A 2 644 684.

The PDI used for preparing the polyisocyanate component a-2) based on IPDI is preferably prepared by phosgenation of isophoronediamine. It is further possible to use IPDI for the preparation of the polyisocyanate components a-2) based on IPDI, which has been prepared by thermal cleavage of the urethane bonds of diurethanes of the IPDI which have been obtained on the phosgene free route. Regardless of the type of the above described kind of chosen oligmerization reaction (trimerization and/or biuretization) in this embodiment the preparation of the polyisocyanate components a-2) based on IPDI, used according to the present invention, can be carried out as follows:

Preparation 1: Unlike as for example usual in the preparation of lacquer polyisocyanates and as described in the above cited patent literature it can be abstained from separating unreacted monomeric IPDIs after oligomerization occurred. Therewith it is possible to obtain clear, essentially colorless isocyanurate- and/or biuret-groups containing solutions comprising monomeric IPDI and at least one oligomeric polyisocyanate based on IPDI. This is a preferred approach. This allows preparation of the polyisocyanate component a-2) based in IPDI in one process step.

Preparation 2: In an alternative approach the preparation of the polyisocyanate component a-2) based on IPDI is carried out by preparing at least one oligomeric polyisocyanate based on IPDI preferably according to the above described known process. The obtained at least one oligomeric polyisocyanate based on IPDI is purified by conventional procedures, so that it is essentially low monomeric. The at least one oligomeric polyisocyanate based on IPDI in this case is usually present as a solid at room temperature. It can be dissolved in monomeric IPDI to obtain the polyisocyanate component a-2) based on IPDI. However, this approach is not preferred because it is more complex than the process described previously.

In a preferred embodiment the polyisocyanate component a-2) based on IPDI comprises monomeric IPDI and at least one oligomeric polyisocyanate based on IPDI.

In a particularly preferred embodiment the polyisocyanate component a-2) based on IPDI comprises a larger amount of the monomeric IPDIs, based on the mass, compared to the amount of the oligomeric polyisocyanates based on IPDI.

Thus, in this embodiment the polyisocyanate component a-2) based on IPDI comprises, based on a total mass of the polyisocyanate component a-2) based on IPDI, monomeric IPDI in excess of the oligomeric polyisocyanate based on IPDI.

The polyisocyanate components a-2) based on IPDI according to the embodiment described above can preferably be obtained by the preparation process according to preparation 1 and 2, too. Particularly preferably it is obtained by preparation 1.

The polyisocyanate component a-2) based on IPDI preferably comprises 10 to 45 wt.-%, more preferably 20 to 40 wt.-% oligomeric polyisocyanate based on IPDI and preferably 90 to 55 wt.-%, more preferably 80 to 60 wt.-% of the monomeric IPDI's based on the total mass of both.

The polyisocyanate component a-2) based on IPDI, wherein, based on the mass, preferably the amount of the monomeric IPDI's is higher than the amount of the at least one oligomeric polyisocyanate based on IPDI, preferably has an amount of isocyanate groups of 27 to 36 wt.-% and more preferably of 29 to 33 wt.-%, and even more preferred of 28 to 32 wt.-%, based on the polyisocyanate component a-2) based on IPDI.

The polyisocyanate component a-2) based on IPDI preferably has a viscosity of 100 to 3000 mPa·s, more preferably 300 to 2800 mPa·s, even more preferred 500 to 2650 mPa·s at 23° C.

The component A) comprising 10 to 50 wt.-% of at least one polyisocyanate a-1) based on HDI, comprising at least one oligomeric polyisocyanate a-1) based on HDI and optionally monomeric HDI and 50 to 90 wt.-% of at least one polyisocyanate component a-2) based on IPDI, comprising monomeric isophorone diisocyanate (IPDI) and at least one oligomeric polyisocyanate based on IPDI and optionally monomeric IPDI, can preferably be obtained by simple mixing of the components a-1) and a-2). The mixing can preferably be supported by stirring. Preferably a homogeneous mixture should be obtained. In particular the homogeneity of the mixture can be improved by preheating the components a-1) and a-2) to temperatures of preferably 30 to 120° C. before mixing. Preferably the temperature of the mixture of a-1) and a-2) is maintained at preferably 30 to 100° C., more preferably 40 to 80° C. by additional heating. However, it is a particular advantage that the mixing of components a-1) and a-2) as well as particularly the casting can occur at room temperature, when the polyisocyanate component a-2) based on its mass has an amount of monomeric IPDI which is larger than the amount of the oligomeric polyisocyanate based on IPDI. This particularly results from the viscosity of component a-2) at room temperature.

Accordingly, component A) is preferably present in the form of a clear, essentially colorless mixture. The component A) preferably has a viscosity of 100 to 3000 mPa·s, more preferably 150 to 2700 mPa·s, even more preferred 200 to 2210 mPa·s at 23° C.

The amount of isocyanate groups of component A) is preferably in the range of 24 to 34 wt.-%, more preferably 25 to 32 wt.-%, even more preferred 26 to 30 wt.-% based on the total weight of component A).

In one preferred embodiment component A) comprises 10 to 50 wt.-% of at least one oligomeric polyisocyanate a-1) based on HDI and 50 to 90 wt.-% of at least one polyisocyanate a-2), comprising monomeric IPDI and at least one oligomeric IPDI, wherein, based on the mass, the amount of the monomeric IPDIs is higher than the amount of the oligomeric polyisocyanates based on IPDI. As described above, this embodiment particularly has the advantage that the processing of component a-2) as well as the composition is possible at room temperature due to the high amount of the monomeric IPDI in the component a-2) as well as in the total composition. The resulting properties of the cured composition are preferably not substantially influenced. Thus, particularly preferably the mechanical as well as the optical properties of the cured composition of this embodiment are essentially identical to those of a cured composition wherein in component a-2) the amount of the monomeric IPDIs is less than the amount of the oligomeric polyisocyanates based on IPDI.

Component A) is preferably solvent-free.

Component B)

The composition according to the present invention comprises at least one sulfur-containing component.

This component B) is preferably capable to react with component A), which comprises isocyanate groups, due to the in the statistical average at least two isocyanate-reactive groups per molecule.

Particularly preferably the component B) has an average functionality in respect of the isocyanate-reactive groups from 2.0 to 4.0. The equivalent ratio of isocyanate groups of component A) to isocyanate-reactive groups of component B) is preferably from 0.5:1 to 2.0:1, more preferably from 0.7:1 to 1.3:1, even more preferred from 0.8:1 to 1.2:1 und even most preferred 1:1.

Component B) is preferably solvent-free. Further, the sulfur-containing component B) preferably has a molecular weight of 78 to 1000 g/mol, more preferably of 140 to 800 g/mol, even more preferred from 264 to 488 g/mol.

In a preferred embodiment the isocyanate reactive component is free of aromatic structures. Aromatic structures are particularly responsible for that the resulting plastics are not light resistant and resistant to yellowing.

In a preferred embodiment the sulfur-containing component is selected from the group consisting of polythiols, sulfur containing hydroxy compounds, and mixtures thereof.

Polythiols

Suitable components B) are particularly compounds, which have at least two thiol-groups per molecule.

Preferred polythioles are for example selected from the group consisting of simple alkanethiols, such as for example methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol or 2-methylcyclohexane-2,3-dithiol, thioether-groups comprising polythiols, such as for example 2,4-dimercaptomethyl-1,5-dimercapto-3-thiapentane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimer-capto-3,6,9-trithiaundecane, 5,7-dimercaptomethyl-1,11-dimercapto-3,6,9-trithiaundecane, 5,6-bis-(mercaptoethylthio)-1,10-dimercapto-3,8-dithiadecane, 4,5-bis-(mercaptoethylthio)-1,10-dimercapto-3,8-dithiadecane, tetrakis(mercaptomethyl)methane, 1,1,3,3-tetrakis(mercaptoethylthio)propane, 1,1,5,5-tetrakis(mercaptomethylthio)-3-thiapentane, 1,1,6,6-tetrakis(mercaptomethylthio)-3,4-dithiahexane, 2-mercaptoethylthio-1,3-dimercaptopropane, 2,3-bis(mercaptoethylthio)-1-mercaptopropane, 2,2-bis(mercaptomethyl)-1,3-dimercaptopropane, bis-(mercaptomethyl)sulfide, bis(mercaptomethyl)disulfide, bis(mercaptoethyl)sulfide, bis(mercapto-ethyl)disulfide, bis(mercaptopropyl)sulfide, bis(mercaptopropyl)disulfide, bis(mercaptomethyl-thio)methane, tris(mercaptomethylthio)methane, bis(mercaptoethylthio)methane, tris(mercapto-ethylthio)

methane, bis(mercaptopropylthio)methane, 1,2-bis(mercaptomethylthio)ethane, 1,2-bis-(mercaptoethylthio)ethane, 2-mercaptoethylthio)ethane, 1,3-bis(mercaptomethylthio)propane, 1,3-bis(mercaptopropylthio)propane, 1,2,3-tris(mercaptomethylthio)propane, 1,2,3-tris(mercapto-ethylthio)propane, 1,2,3-tris(mercaptopropylthio)propane, tetrakis(mercaptomethylthio)methane, tetrakis(mercaptoethylthiomethyl)methane, tetrakis(mercaptopropylthiomethyl) methane, 2,5-dimercapto-1,4-dithiane, 2,5-bis(mercaptomethyl)-1,4-dithiane and its oligomers obtainable according to JP-A 07118263, 1,5-bis(mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptomethyl-1,3,5-trithiane or 2-(3-bis(mercaptomethyl)-2-thiapropyl)-1,3-dithiolane,
polyesterthiols, such as for example ethylene glycol-bis(2-mercaptoacetate), ethylene glycol-bis(3-mercaptopropionate), diethylene glycol(2-mercaptoacetate), diethylene glycol(3-mercaptopropionate), 2,3-dimercapto-1-propanol (3-mercaptopropionate), 3-mercapto-1,2-propandiol-bis(2-mercapto-acetate), 3-mercapto-1,2-propandiol-bis(3-mercaptopropionate), trimethylolpropane-tris(2-mercaptoacetate), trimethylolpropane-tris(3-mercaptopropionate), trimethylolethane-tris(2-mercaptoacetate), tri-methylolethane-tris(3-mercaptopropionate), pentaerythrit-tefrakis(2-mercaptoacetate), pentaerythrit-tetrakis(3-mercaptopropionate), glycerin-tris(2-mercaptoacetate), glycerin-tris(3-mercapto¬ propionate), 1,4-cyclohexanediol-bis(2-mercaptoacetate), 1,4-cyclohexanediol-bis(3-mercaptopropionate), hydroxy-methylsulfide-bis(2-mercaptoacetate), bydroxymethylsulfide-bis(3-mercaptopropionate), hydroxyethylsulfide(2-mercaptoacetate), hydroxyethylsulfide(3-mercaptopropionate), hydroxymethyldisulfide(2-mercaptoacetate), hydroxymethyldisulfide(3-mercaptopropionate), (2-mercaptoethylester)thioglycolate or bis(2-mercaptoethylester)thiodipropionate and aromatic thiocompounds such as for example 1,2-dimercaptobenzol, 1,3-dimercaptobenzol, 1,4-dimercaptobenzol, 1,2-bis(mercaptomethyl)benzol, 1,4-bis(mercaptomethyl)benzol, 1,2-bis(mercaptoethyl)benzol, 1,4-bis(mercaptoethyl)benzol, 1,2,3-trimercaptobenzol, 1,2,4-trimercaptobenzol, 1,3,5-trimercaptobenzol, 1,2,3-tris-(mercaptomethyl)benzol, 1,2,4-tris(mercaptomethyl)benzol, 1,3,5-tris(mercaptomethyl)benzol, 1,2,3-tris(mercaptoethyl)benzol. 1,3,5-tris(mercaptoethyl)benzol, 1,2,4-tris(mercaptoethyl)benzol, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzol, 1,2,3,5-tetramercapto-benzol, 1,2,4,5-tetramercaptobenzol, 1,2,3,4-tetrakis(mercaptomethyl)benzol, 1,2,3,5-tetrakis(mercaptomethyl)benzol, 1,2,4,5-tetrakis(mercaptomethyl)benzol, 1,2,3,4-tetrakis(mercapto-ethyl)benzol, 1,2,3,5-tetrakis(mercaptoethyl)benzol, 1,2,4,5-tetrakis(mercaptoethyl)benzol, 2,2'-dimercaptobiphenyl or 4,4-dimercaptobiphenyl. Such polythiols can be used individually as well as in form of any mixture thereof.

Sulfur-Containing Hydroxy Compounds

Further, sulfur-containing hydroxy compounds are particularly suitable as component B), too.

Such compounds particularly comprise at least one sulfur-atom in the form of thio groups, thioether groups, thioester urethane groups, ester thiourethane groups and/or polythioesterthiourethane groups as well as at least one OH-group.

Preferred sulfur-containing hydroxy compounds can be selected from the group consisting of simple mercapto alcohols such as for example 2-mercaptoethanol, 3-mercaptopropanol, 1,3-dimercapto-2-propanol, 2,3-dimercaptopropanol or dithioerythritol, thioether structures comprising alcohols such as for example di(2-hydroxyethyl)sulfide, 1,2-bis(2-hydroxyethylmercapto)ethane, bis(2-hydroxyethyl)disulfide or 1,4-dithian-2,5-diol, and sulfur-containing diols with polyester urethane-, polythioester urethane-, polyesterthiourethane- or polythioester thiourethane structure of the kind as mentioned in EP-A 1 640 394. Such sulfur-containing hydroxy compounds can be used individually as well as in form of any mixture thereof.

Particularly preferred sulfur-containing components B) are polyether- and polyesterthiols of the named kind. Even more preferred components B) can be selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercapto-methyl-1,11-dimercapto-3,6,9-trithiaundecane, trimethylolpropane-tris(2-mercaptoacetate), trimethylolpropane-tris(3-mercaptopropionate), pentaerythrit-tetrakis(2-mercaptoacetate) and pentaerythrit-tetrakis(3-mercaptopropionate).

Component C)

Besides the named components A) and B) optionally one or more auxiliaries and/or additives C) can be used. These are preferably selected from the group consisting of catalysts, UV-stabilizers, antioxidants, mold release agents, and any mixture thereof.

As catalysts conventional, in the polyurethane chemistry well known catalysts can be used. Preferred catalysts may be selected from the group consisting of tertiary amines, such as triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethylether, bis-(dimethylaminopropyl)urea, N-methylmorpholine, N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethl-1,6-hexanediamine, pentamethyldiethylenetriamine, N-methylpiperidine, N-dimethylaminoethylpiperidine, N,N'-dimethylpiperazin, N-methyl-N'-dimethylaminopiperazin, 1,8-diazabicyclo(5.4.0)undecen-7 (DBU), 1,2-dimethylimidazol, 2-methylimodazol, N,N-dimethylimidazol-p-phenylethylamine, 1,4-diazabicyclo-(2,2,2) octan, bis-(N,N-dimethylaminoethyl)adipat; alkanolamine compounds such as for example triethanolamine, triisopropanolamine, N-methyl and N-ethyl-diethanolamine, dimethylaminoethanol, 2-(N,N-dimethylaminoethoxyethanol, N,N',N"-tris-(dialkylaminoalkyl)hexahydrotriazine, N,N', N"-tris-(dimethylaminopropyl)-S-hexahydrotriazin, bis(dimethylaminoethyl)ether; metal salts such as for example anorganic and/or organic compounds of iron, lead, bismuth, zinc and/or tin in usual oxidation states of the metals, for example iron(II)chloride, iron(III)chloride, bismuth(III)-, bismuth(III)-2-ethylhexanoat, bismuth(III)-octoat, bismuth(III)-neodecanoat, zinc chloride, zinc-2-ethylcaproat, tin(II)-octoat, tin(II)-ethylcaproat, tin(II)-palmitat, dibutyltin(IV)-dilaurat (DBTL), dibutylfin(IV)-dichloride, lead octoat, amidine such as for example 2,3-dimethyl-3,4,5,6-tetrahydropyrimidine; tetraalkylammoniumhydroxide such as for example teframethylammoniumhydroxid; alkalihydroxide such as for example sodium hydroxide, alkali alcoholate such as for example sodium methylate, potassium isopropylat and alkali salts of long chained fatty acids with 10 to 20 carbon atoms and optionally side chain OH-groups.

Particularly preferred catalysts C) to be used are tertiary amines, tin, zinc and bismuth compounds of the named kind.

The named catalysts can be used in the preparation of the transparent materials according to the present invention either individually or in form of any mixture thereof. If at all they are preferably used in amounts of 0.01 to 5.0 wt.-%, more preferably 0.1 to 2 wt.-%, calculated as total amount of used catalyst related to the total amount of used component A) and B) of the composition according to the present invention.

The transparent materials obtained from the composition according to the present invention per se have a good light resistance, which means even without addition of appropriate stabilizers. Nevertheless in its preparation optionally UV-stabilizers (light stabilizers) or antioxidants of known type can be added as further auxiliaries and additives C).

Suitable UV-stabilizers can preferably be selected from the group consisting of piperidine derivatives such as for example 4-benzoyloxy-2,2,6,6-tetramethylpiperidine, 4-benzoyloxy-1,2,2,6,6-pentamethylpiperidine, bis-(2,2,6,6-tetra-methyl-4-piperidyil)-sebacat, bis(1,2,2,6,6-pentamethyl-1,4-piperidinyl)-sebacat, bis-(2,2,6,6-tetramethyl-4-piperidyl)-suberat, bis-(2,2,6,6-tetramethyl-4-piperidyl)-dodecandioat, benzophenon derivatives such as 2,4-dihydroxy-, 2-hydroxy-4-methoxy, 2-hydroxy-4-octoxy, 2-hydroxy-4-dodecyloxy or 2,2'-dihydroxy-4-dodecyloxy-benzophenon, benztriazol derivatives such as for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chlor-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl-3-(3-(2H-benzotriazol-2-yl)-5-(1,1-dimethylethyl)-4-hydroxyphenylpropionat), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chlor-2H-benzotriazol-2-yl)-4,6-bis(1,1-dimethylethylphenol, oxalaniliden such as for example 2-ethyl-2'-ethoxy or 4-methyl-4'-methoxyoxalanilid; salicylates such as for example salicylicacid phenylester, salicylicacid-4-tert-butylphenylester, salicylicacid-4-tert-octylphenylester, cinnamic derivatives such as for example α-cyano-β-methyl-4-methoxy-cinnamic methylester, -cyano-β-methyl-4-methoxy-cinnamic-ester, α-cyano-β-phenyl-cinnamic-ethylester, α-cyano-β-phenyl-cinnamic-octylester and maloneester derivatives such as for example 4-methoxy-benzylidenemalonacid dimethylester, 4-methoxybenzylidenmalonacid diethylester, 4-butoxy-benzylidenemalonacid dimethylester. These preferred light stabilizers can be used individually as well as in any combination.

Especially preferred UV-stabilizers for the transparent materials which can be prepared according to the present invention completely absorb radiation at a wavelength <400 nm so that in the use of such compositions of the present invention as spectacle lenses complete protection of the eye against UV-radiation is given. In this context for example the named benztriazol derivatives can be mentioned. UV stabilizers with bentriazol structure are preferred. Specially preferred UV-stabilizers are 2-(5-chlor-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chlor-2H-benzotriazol-2-yl)-4,6-bis(1,1-dimethylethyl)phenol.

If at all, the exemplified UV stabilizers of the composition according to the present invention are preferably used in amounts of 0.001 to 3.0 wt.-%, more preferably 0.01 to 2 wt.-%, calculated as total amount of used UV stabilizers related to the total amount of the used components A) and B) of the compositions of the present invention.

Suitable antioxidants are preferably sterically hindered phenols, which can be preferably selected from the group consisting of 2,6-di-tert-butyl-4-methylphenol (lonol), pentaerythrit-tetrakis(3-(3,5-di-tert-butyl-4-hydroxy-phenyl) propionate), octadecyl-3-(3,5-di-tert-butyl-4-hydroxyphenyl)-propionate, triethyleneglycol-bis(3-tert-butyl-4-hydroxy-5-methylphenyl)propionate, 2,2'-thio-bis(4-methyl-6-tert-butylphenol) and 2,2'-thiodiethyl-bis[3-(3,5-di-tert-butyl-4-hydroxyphenyl)propionate]. These can be used either individually or in any combination with one another as needed.

These antioxidants are preferably used in amounts of 0.01 to 3.0 wt.-%, more preferably 0.02 to 2 wt.-%, calculated as total amount of used antioxidant related to the total amount of the used components A) and B) of the composition according to the present invention.

The composition of the present invention can optionally comprise as further auxiliaries and additives C) internal mold release agents.

These are preferably, known as mold release agents, perfluroalkyl- or polysiloxane units comprising non-ionic surfactants, quaternary alkyl ammonium salts such as for example trimethylethyl ammonium chloride, trimethylstearyl ammonium chloride, dimethylethylcetyl ammonium chloride, triethyldodecyl ammonium chloride, trioctylmethyl ammonium chloride and diethylcyclohexyldodecyl ammonium chloride, acid mono and dialkylphosphate with 2 to 18 carbon atoms in the alkyl chain such as for example ethylphosphate, diethylphosphate, isopropylphosphate, diisopropylphosphat, butylphosphate, dibutylphosphate, octylphosphate, dioctylphosphate, isodecylphosphate, diisodecylphosphate, dodecylphosphate, didoceylphosphate, tridecanolphosphate, bis(tridecanol)phosphate, stearylphosphate, distearylphosphate and any mixture of such mold release agents.

Especially preferred mold release agents are the named acid mono and dialkylphosphates, most preferred such with 8 to 12 carbon atoms in the alkyl chain.

Internal mold release agents are used in compositions according to the present invention, if at all, preferably in amounts of 0.01 to 3 wt.-%, more preferably 0.02 to 2 wt.-%, calculated as total amount of the used internal mold release agent related to the total amount of used components A) and B) compositions of the present invention.

To compensate a yellowness which may arise in the polyurethanes obtainable according to the present invention, for example by adding the above described UV stabilizers, the compounds of the present invention can preferably include as further auxiliary and additive C) optional per se known blueing agents. To prevent a reduction of transmission or graying of the materials these are preferably used only in extremely low concentrations, for example in amounts of 5 ppb to 50 ppm. The addition is carried out preferably in form of a master batch which means as a pre-formulated diluted solution in any of the other formulation parts, for example component A) and/or component B).

Suitable blueing agents for compositions of the present invention can be preferably selected from the group consisting of commercially available anthrachinone dyes such as for example Exalite Blue 78-13 of the company Exciton, Inc. Dayton, Ohio, USA or Macrolex Violet B, Macrolex Blue RR and Macrolex Violet 3R of the company Lanxess AG, Leverkusen, Germany and any mixture thereof.

All of the above named, optionally added auxiliaries and/or additives C) can be mixed with component A) or with component B). Preferably components C) selected from the group consisting of internal mold release agents, catalysts and mixtures thereof are admixed with component A). Component C) which is selected from the group consisting of UV stabilizers, antioxidants, dyes and mixtures thereof are preferably admixed with component B).

In a preferred embodiment a composition is provided wherein at least one, preferably all of the following features are realized
- component A) consisting of a-1) and a-2) has a viscosity of 100 to 3000 mPa·s at 23° C. and an amount of isocyanate groups of 24 to 34 wt.-%,
- component a-1) based on HDI has an NCO-amount of 20 to 24 wt.-%,
- component a-2) based on IPDI is a solution of an oligomeric polyisocyanate based on isophorone diisocyanate in an access weight amount (>50 wt.-% based on the total amount of a-2)) of monomeric isophorone diisocyanate with an NCO-amount of component a-2) of 27 to 36 wt.-%,
- component B) has a molecular weight of 78 to 1000 g/mol,
- component B) has an average functionality of 2 to 4
- component B) is a polythiol and/or a sulfur-containing hydroxy compound,
- optionally one or more auxiliaries and/or additives C), preferably at least one catalyst, at least one UV-stabilizer, at least one antioxidant and at least one mold release agent is comprised.

The equivalent ratio of isocyanate groups in A) compared to isocyanate-reactive groups in B) is from 0.5:1 to 2.0:1.

In a further embodiment of the present invention the composition according to the invention consists of components A), B) and C).

In a further embodiment the present invention relates to a kit-of-parts combination comprising the components A) and B), as defined above, in separated spatial arrangement. This can be a two-component-system. In such case, the optionally present component C) as defined above, can be added to one or both of components A) and B). A preferred component C) is selected from the group consisting of internal release agents, catalysts and mixtures thereof added to component A). Component C) which is selected from the group consisting of UV stabilizers, antioxidants, dyes and mixtures thereof is preferably added to component B). Furthermore it is possible that the optionally present component C) is partly or completely present in a third, spatially separated component of the kit-of-parts system. Therein the auxiliaries and/or additives can be separated so that some can be admixed with the components A) and/or B) and others are present as third component.

Polythiourethanes of the Present Invention

The composition of the present invention, comprising the described components A) and B) and optionally the component C) is preferably mixed by using suitable mixing units in ratios, as above preferably defined by the equivalent ratio of diisocyanate groups compared to the isocyanate reactive groups or by wt.-%. Subsequently the mass of the present invention can be cured by any method, preferably in open or closed molds, preferably by simple pouring per hand or by using appropriate equipment such as for example low pressure or high pressure machines which are customary in polyurethane technology or by carrying out the RIM-procedure. Preferably, temperatures of up to 160° C., more preferably 10 to 140° C., even more preferred 20 to 130° C. are used. Optionally the curing can be carried out under elevated pressure, preferably up to 300 bar, more preferably up to 100 bar, even more preferred up to 40 bar.

The composition of the present invention can be used for the preparation of the polythiourethanes according to the present invention. Such polythiourethanes are formed by reacting the isocyanate groups of compononent A) with the isocyanato-reactive groups of component B). Thereby preferably one polythiourethane group (1) is formed. Further, it is possible, that one of the following groups (1) to (4) is already present in component B) and by reaction of component A) with component B) preferably at least one urethane group is formed. This particularly occurs, when the sulfur-containing component B) comprises at least one hydroxy group. Accordingly, polythiourethanes within the meaning of the present invention comprises compounds, which preferably contain at least one of the following groups (1) to (4)

(1)

(2)

(3)

(4)

with the proviso that in case when the polythiourethane comprises at least one of the groups (2) to (4), this polythiourethane further comprises at least one urethane group and/or thiourethane group (1). Particularly preferred is that the polythiourethanes of the present invention comprise at least one of the groups (1) and/or (4), with the proviso that in case when the polythiourethane comprises at least one of the group (4), this polythiourethane further comprises at least one urethane group and/or thiourethane group (1).

Further, it is possible that other functional groups besides these groups (1) to (4) can be present in the polyurethane of the present invention due to side reactions. However this is less preferred.

The composition of the present invention can be used for preparing transparent materials which consist of the polythiourethane of the present invention. Thus, particularly the prepared polythiourethane is used for preparing transparent materials.

The composition of the present invention can further be used for preparing transparent molded articles. Therein the molded article is particularly formed by using the prepared polythiourethanes. Further, the prepared transparent material can be used for preparing transparent molded articles.

Molded articles within the meaning of the present invention are particularly moldings as defined in DIN 7708, so to say designed plastic products which are prepared from molding masses or semi-finished materials. Therein molding masses refers to liquid, pasty or solid substances in processable state which can be formed to semi-finished materials or molded articles by non-cutting procedures. This is in contrast to a coating as is particularly defined in EN ISO 4618:2006

Therein a coating is defined to form a continuous layer formed by a single or repeated application of a coating material onto a substrate. Thus, a coating is particularly characterized by the presence of a corresponding substrate. In particular coatings are generally remarkably thinner than molded articles. Particularly preferred molded articles of the present invention are three dimensional one piece molded articles, the smallest dimension (thickness) being at least 1 mm, more preferably at least 2 mm, more preferably at least 3 mm. Preferably these molded articles exhibit such a dimension that their geometry can encompass a sphere with a diameter of at least 1 mm, preferably at least 2 mm, more preferably at least 3 mm.

The molded articles of the present invention are suitable for a variety of different applications of transparent materials, particularly as a glass substitute for preparing panes, for example sunroofs, front-, rear- or side-windows in the automotive or aircraft engineering, as safety glass or for transparent sealing of optical, electronic or optoelectronic devices, such as for example solar modules, LEDs or lenses or collimators as they are used for example as optical head in LED-lights or car headlights.

In addition the molded article of the present invention can be an optical lens. An optical lens is particularly an optically active element with two refractive surfaces. Particularly, an optically lens is understood to be a transparent molded article which allows imaging of objects in reduced or enlarged size using light refraction. Such lenses are particularly used in microscopes, telescopes, lenses, lights, projectors, magnifying glasses and spectacle lenses. In optical devices such lenses are usually combined to form a lens system.

It is particularly preferred to use the polyurethane of the present invention for preparing a transparent molded article which is an optical lens. Most preferred is the use of the polyurethane of the present invention for preparing an optical lens which is a spectacle glass.

The preparation of optical lenses, particularly spectacle lenses, is usually carried out by using common casting processes as used in the eyeglass industry. Therein it is preferred to use casting molds comprising two glass molds and a polymeric sealing ring, wherein the composition of the invention is cured. It is preferred to cure without pressure. More preferably a strict temperature control is used. Such temperature control is preferably carried out in the range of 10 to 150° C., preferably for a period of up to 60 hours, more preferably up to 48 hours. In a preferred embodiment curing is carried out solvent free. In a further preferred embodiment the preparation process comprises a step of post-annealing of the demolded transparent materials after the reaction.

In one aspect of the present invention a polythiourethane is provided which is obtained by curing the composition of the present invention.

In another aspect of the present invention an optical lens is provided which is obtained by using the composition of the present invention.

In a further aspect of the present invention a spectacle lens is provided which is obtained by using the composition of the present invention.

Furthermore, a process for preparing transparent materials by curing the compositions of the present invention is provided. Therein the transparent materials may particularly be transparent molded articles. Such molded articles are preferably optical lenses, particularly spectacle lenses.

To ensure absence of bubbles and highest transparency of the transparent materials of the present invention the both components A) and B) are deaerated before being mixed, usually after addition of optionally used auxiliaries and additives C). This can be carried out for example for 10 minutes up to six hours at temperatures up to 80° C. under reduced pressure, for example at 5 to 50 mbar. Subsequently the composition is optionally again cooled to temperatures <50° C., preferably <30° C. and is preferably mixed and poured into glass molds on fine filters with a preferred average pore size of 0.1 to 10 µm. For controlled curing of the composition it is preferred to cool down the filled and closed glass molds. Then the temperature can be <20° C. Subsequently linear or stepwise heating up to a temperature of preferably >100° C., for example up to 130° C., is carried out for several hours.

After curing is completed and cooling to room temperature the thus obtained blanks are removed from the molds. To reduce stresses in the material they are usually post-annealed at temperatures of preferably >100° C., for example at 130° C. for several hours, for example for up to 10 hours. The development of the curing can for example be effected by IR-spectroscopic determination of the still present isocyanate groups.

In this way from the compositions according to the present invention highly transparent materials, in particular spectacle lens blanks, can be obtained. Such spectacle lens blanks can be further processed into finished spectacle lenses by current methods such as for example grinding, polishing, coloring, application of anti-reflective coatings, hard coatings and/or hydrophobic coatings by methods well known in the eyeglass industry.

Such method allows the preparation of spectacle lenses with yellowing resistance. These preferably have high refractive indices in the range of 1.56 to 1.60 and having at the same time a low optical dispersion. Further, they exhibit very good mechanical and thermal resistance. Due to their high glass transition temperatures in the range of 100° C. and the high heat resistance of preferably >80° C. they are particularly suitable for preparing rimless glasses. Preferably, the polythiourethane glasses can be equipped with suitable UV stabilizers so that the ultraviolet waves which are harmful to the human eye can be completely filtered in the wavelength range <400 nm.

EXAMPLES

All percentages relate to the weight, unless stated otherwise.

According to the present invention the determination of the NCO contents is carried out by titration according to DIN EN ISO 11909.

NCO functionalities are calculated from the gel permeation chromatogram (GPC).

According to the present invention OH-numbers are determined by titration according to DIN 53240-2: 2007-11, according to the invention acid numbers are determined according to DIN 3682.

The residual monomer contents have been measured by gas chromatography with internal standard according to DIN EN ISO 10283.

The g/val SH-values have been adopted from the manufacturer or have been calculated.

All viscosity measurements have been carried out with a physical MCR rheometer of the company Anton Paar Germany GmbH (DE) according to DIN EN ISO 3219 at the shown temperatures.

The glass transition temperature Tg has been measured using DSC (Differential Scanning calorimetrie) with a Mettler DCS 12E (Mettler Toledo GmbH, Giessen, DE) at a heating rate of 10° C./min.

The determination of the heat resistance HDT has been carried out according to DIN EN ISO 75-2, procedure B, by using a bending stress of 0.45 MPa.

Shore hardness has been measured according to DIN 53505 by using a shore hardness tester Zwick 3100 (company Zwick, DE).

Measurement of the refractive indices and Abbe-numbers has been carried out using an Abbe refractometer model B of company Zeiss.

Transmission measurements according to ASTM D 1003 have been carried out using a Haze-Gard Plus of the company Byk. The wavelength dependent transmission has been determined by using a dual beam spectrophotometer type Lambda 900 with integrated sphere (150 mm) of the company Perkin-Elmer, USA (0°/diffuse, reference: air T=100%).

Component A)

Polyisocyanate a1-I)

The preparation of a isocyanurate group containing HDI polyisocyanate was carried according to example 11 of EP-A 330 966 with the modification that 2-ethylhexanol was used as catalyst solvent instead of 2-ethyl-1,3-hexanediol.
NCO content: 22.9%
NCO functionality: 3.2
monomeric HDI: 0.1%
viscosity (23° C.) 1200 mPa·s Polyisocyanate a1-II)

The preparation of an isocyanurate- and iminoxadiazindion group containing HDI polyisocyanate was carried out according to example 4 of EP A 0 962 455, by trimerisation of HDI by using a 50% solution of tetrabutylphosphonium hydrogen difluorid in isopropanol/methanol (2:1) as catalyst. The reaction was stopped at an NCO content in the crude mixture of 43% by adding dibutylphosphate. Subsequently removal of the unreacted HDIs using thin film distillation at a temperature of 130° C. and a pressure of 0.2 mbar was carried out.
NCO content: 23.4%
NCO functionality: 3.2
monomeric HDI: 0.2%
viscosity (23° C.) 700 mPa·s Polyisocyanate a2-I)

Isophorone diisocyanate (IPDI) was trimerized to an NCO-content of 30.1% according to example 2 of EP-A 0 003 765. The catalyst was deactivated by adding an equimolar amount of dibutylphosphate, relating to the used catalyst amount, and stirring for 30 minutes by 80° C. The separation of unreacted excess IPDI by thin film distillation was omitted. A solution of IPDI-isocyanurate polyisocyanate (35.5 wt-%) in monomeric IPDI (64.5 wt.-%) was present.
NCO-content: 30.5%
monomeric IPDI: 64.5%
viscosity (23° C.): 540 mPa·s Polyisocyanate a2-II)

18 g (1.0 mol) water were added continuously to a mixture of 1554 g (7 mol) IPDI and 0.5 g (0.002 mol) dibutylphosphate under nitrogen environment and stirring at a temperature of 80° C. for a period of 5 hours. A short time after the addition of water a steady $CO_2$-development occurred which was completed after stirring for 3 hours at 90° C. A colorless solution of IPDI-biuret polyisocyanate (38.4 wt.-%) in excess monomeric diisocyanate (61.6 wt.-%) was present.
NCO-content: 30.0%
viscosity (23° C.) 2600 mPa·s Polyisocyanate a2-III)

The monomeric IPDI was separated from the afore mentioned polyisocyanate a2-I) by thin film distillation at a temperature of 170° C. and a pressure of 0.1 mbar. Solid IPDI-isocyanurate polyisocyanate with the following characteristic data was achieved:
NCO-content: 17.0%
monomeric IPDI: 0.3%
Tg: 65° C.

Mixtures of Components a-1) and a-2)

The HDI-polyisocyanate type a-1) was mixed together with a solution of a-2) of IPDI polyisocyanate in excess monomeric IPDI, monomeric HDI and/or IPDI in a reaction vessel at room temperature (in case of polyisocyanate A-VI at 60° C.) under $N_2$-atmosphere until a clear solution was present in each case.

The following table 1 shows compositions (parts by weight) and characteristic data of the so produced polyisocyanates.

TABLE 1

| | Compositions of component A) | | | | | | | | | |
|---|---|---|---|---|---|---|---|---|---|---|
| polyisocyanate | A-I | A-II | A-III | A-IV | A-V | A-VI | A-VII (comp.) | A-VIII (comp.) | A-XI (comp.) | A-X (comp.) |
| polyisocyanate a1-I) | 20 | 30 | 50 | — | 20 | 20 | 55 | 15 | — | — |
| polyisocyanate a1-II) | — | — | — | 30 | — | — | — | — | — | — |
| polyisocyanate a2-I) | 80 | 70 | 50 | 70 | — | 46 | 45 | — | 85 | — |
| polyisocyanate a2-II) | — | — | — | — | 80 | — | — | — | — | — |
| polyisocyanate a2-III) | — | — | — | — | — | 34 | — | — | — | — |
| Hexamethylene diisocyanate | — | — | — | — | — | — | — | — | 15 | 15 |
| Isophorone diisocyanate | — | — | — | — | — | — | — | 85 | — | 85 |
| NCO-content (%) | 29.0 | 28.2 | 26.7 | 28.4 | 28.6 | 24.4 | 26.3 | 35.6 | 33.4 | 39.6 |
| viscosity (23° C.) [mPa·s] | 660 | 720 | 860 | 550 | 2200 | 41100 | 890 | 180 | 450 | 15 |
| viscosity (60° C.) [mPa·s] | n.b. | n.b. | n.b. | n.b. | n.b. | 960 | n.b. | n.b. | n.b. | n.b. |

Component B)
Polythiol B1)
  4-mercaptomethyl-1,8-dimercapto-3,6-dithiaoctane
equivalent weight: 88 g/val SH
functionality: 3.0
viscosity (23° C.): 40 mPa·s
$n_D$: 1.6304
Polythiol B2)
  pentaerythrit-tetrakis(3-mercaptopropionate)
equivalent weight: 122 g/val SH
functionality: 4.0
viscosity (23° C.): 400 mPa·s
$n_D$: 1.5312
Polythiol B3)
  Trimethylolpropan-tris(3-mercaptopropionat)
equivalent weight: 133 g/val SH
functionality: 3.0
viscosity (23° C.): 150 mPa·s
$n_D$: 1.5290
Polythiol B4)
  trimethylolpropane-tris(2-mercaptoacetate)
equivalent weight: 119 g/val SH
functionality: 3.0
viscosity (23° C.): 120 mPa·s
$n_D$: 1.5303

Examples 1 to 7 and Comparative Examples 1 (Comp. 1) to 7 (Comp. 7)

Preparation of Transparent Materials

For preparing transparent materials components A) and B), if applicable by using DBTL as a catalyst, were homogenized in the combinations and amount ratios (parts by weight) as shown in table 2, each according to an equivalent ratio of isocyanate groups to isocyanate-reactive groups of 1:1, using a speed-mixer DAC 150 FVZ (company Hauschild, DE) within 1 minute at 3500 U/min and subsequently poured by hand at room temperature into open non-heated polypropylene molds. Due to the high viscosity of the polyisocyanate component A-VI at room temperature this was heated to a temperature of 60° C. to facilitate the processability before weighing (all other polyisocyanate components were processed at room temperature). After a curing time of 8 hours at 100° C. in a drying cabinet the test plates (length×width×height: 200 mm×100 mm×4 mm) were demoled.

After a post-curing time of 24 hours at room temperature the test plates were tested with regard to their optical and mechanical properties. The results are shown in table 2, too.

TABLE 2 optical and mechanical properties of the prepared test plates

| example | a-1):a-2) | 1 | 2 | 3 | 4 | 5 | 6 | 7 |
|---|---|---|---|---|---|---|---|---|
| polyisocyanate A-I | 20:80 | 62.2 | — | 54.3 | — | — | — | — |
| polyisocyanate A-II | 30:70 | — | 62.9 | — | — | — | — | — |
| polyisocyonate A-III | 50:50 | — | — | — | 53.4 | — | — | — |
| polyisocyanate A-IV | 30:70 | — | — | — | — | 55.4 | — | — |
| polyisocyanate A-V | 20:80 | — | — | — | — | — | 62.5 | — |
| polyisacyanate A-VI | 20:80 | — | — | — | — | — | — | 58.5 |
| polyisocyanate A-VII | 55:45 | — | — | — | — | — | — | — |
| polyisocyanate a2-I) | 0:100 | — | — | — | — | — | — | — |
| polyisocyanate A-VIII | | — | — | — | — | — | — | — |
| polyisacyanate A-IX | | — | — | — | — | — | — | — |
| polyisocyanate A-X | | — | — | — | — | — | — | — |
| m-xylylene diisocyanate | | — | — | — | — | — | — | — |
| polythiol B1) | | 37.8 | 37.1 | — | — | — | 37.5 | — |
| polythiol B2) | | — | — | 45.7 | — | — | — | 41.5 |
| polythiol B3) | | — | — | — | 46.6 | — | — | — |
| polythiol B4) | | — | — | — | — | 44.6 | — | — |
| density [g/cm³] | | 1.234 | 1.239 | 1.247 | 1.243 | 1.220 | 1.204 | 1.246 |
| Shore-hardness D | | 86 | 84 | 85 | 85 | 87 | 83 | 88 |
| Tg [° C.] | | 136 | 136 | 139 | 108 | 115 | 133 | 140 |
| HDT [° C.] | | 102 | 101 | 97 | 91 | 95 | 97 | n.b. |
| refractive index | | 1.587 | 1.586 | 1.549 | 1.541 | 1.548 | 1.549 | 1.552 |
| Abbe-number | | 41 | 42 | 40 | 42 | 49 | 49 | 42 |
| transmission [%] | | 92.4 | 91.1 | 92.6 | 91.3 | 91.2 | 92.4 | 91.9 |

| example | comp. 1 | comp. 2 | comp. 3 | comp. 4 | comp 5 | comp. 6 | comp. 7 |
|---|---|---|---|---|---|---|---|
| polyisocyanate A-I | — | — | — | — | — | — | — |
| polyisocyanate A-II | — | — | — | — | — | — | — |
| polyisocyonate A-III | — | — | — | — | — | — | — |
| polyisocyanate A-IV | — | — | — | — | — | — | — |
| polyisocyanate A-V | — | — | — | — | — | — | — |
| polyisacyanate A-VI | — | — | — | — | — | — | — |
| polyisocyanate A-VII | 64.2 | — | — | — | — | — | — |
| polyisocyanate a2-I) | — | 61.0 | 58.2 | — | — | — | — |
| polyisocyanate A-VIII | — | — | — | — | 57.3 | — | — |
| polyisacyanate A-IX | — | — | — | — | — | 58.9 | — |
| polyisocyanate A-X | — | — | — | — | — | — | 54.6 |
| m-xylylene diisocyanate | — | — | — | 43.6 | — | — | — |
| polythiol B1) | 35.8 | 39.0 | 25.1 | — | 42.7 | 41.1 | 45.7 |
| polythiol B2) | — | — | 16.7 | 56.4 | — | — | — |
| polythiol B3) | — | — | — | — | — | — | — |
| polythiol B4) | — | — | — | — | — | — | — |

TABLE 2-continued

| optical and mechanical properties of the prepared test plates | | | | | | | |
|---|---|---|---|---|---|---|---|
| density [g/cm$^3$] | 1.247 | 1.240 | 1.233 | 1.370 | 1.242 | 1.237 | 1.245 |
| Shore-hardness D | 79 | 87 | 86 | 78 | 82 | 87 | n.b. |
| Tg [° C.] | 97 | 44 | 120 | 90 | 96 | 113 | 80 |
| HDT [° C.] | 55 | n.b. | n.b. | 74 | 71 | n.b. | n.b. |
| refractive index | 1.583 | 1.586 | 1.573 | 1.597 | 1.591 | 1.586 | 1.598 |
| Abbe-number | 42 | 39 | 38 | 36 | 42 | 42 | 37 |
| transmission [%] | 91.8 | 91.1 | 91.3 | 92.3 | 92.1 | 91.1 | 92.8 |

As the examples show, the polythiourethane systems according to the present invention provide hard, highly transparent plastics which have a high refractive index, and high Abbe-numbers besides high glass transition temperatures and heat resistance. The test plates which have been prepared for comparison by using a component a-1) with a higher amount of HDI-polyisocyanate than claimed in the present invention (comp. 1) shows an insufficient glass transition temperature and heat resistance. Thus, the obtained material is less suitable for preparing spectacle lenses. The test plates which have been prepared for comparison by using only component a-2) based on IPDI (comp. 2 and 3) were extremely brittle and broke by deforming. The use of an araliphatic diisocyanate (mSDI) as crosslinker component (comp. 4) leads to a high refractive polythiourethane, which besides a comparably low heat resistance particularly has a strong optical dispersion (low Abbe-number).

The use of a polyisocyanate component, which exclusively contains monomeric IPDI besides an oligomeric HDI-polyisocyanate (comp. 5) leads to an polythiourethane with insufficient glass transition temperature and heat resistance.

The materials which have been prepared by using exclusively monomeric HDI (comp. 6 and 7) were not sufficiently elastic but brittle and broke by deforming. Therein, the test sample (comp. 7) was slightly sticky at the surface after the selected curing time (8 hours/100° C.), which is a sign of incomplete crosslinking.

Accordingly, these comparative materials of experiments comp. 1 to comp. 7 are less suitable for the preparation of spectacle lenses.

Example 8

Preparation of an Eye Glass Blank

Polyisocyanate A-I was mixed with 0.16% Zelec® UN (acid phosphate ester release agents, Stepan Company, Northfield, Ill., USA) and 0.5% of Tinuvin® 326 (UV protector, BASF Schweiz AG, Basel) and stirred at 60° C. and 40 mbar for appr. 3 hours for degassing until the end of the visible foam formation. Polythiol B1) was degassed in the some manner.

After cooling to room temperature 62.6 parts by weight of the pretreated and additive treated polyisocyanate A-I were mixed in a stirring vessel with 37.4 parts by weight of the degassed polythiol B1), corresponding to an equivalent ratio of isocyanate groups to isocyanate-reactive groups of 1:1, and the mixture was stirred for 30 minutes under vacuum (approximately 150 mbar). Subsequently the reaction mixture was conveyed via a valve equipped pipeline through a 0.5 μm PTFE-filter into a purified mold consisting of two glass molds and a polymeric sealing ring for spectacle glass blanks (diameter 75 mm, thickness 10 mm, −2 diopters) by applying a positive pressure of nitrogen to the stirring vessel. The casting mold was kept in an oven at 60° C. for 2 hours, then continuously heated up to 115° C. within 3 hours and finally kept at this temperature for further 2 hours. After cooling to room temperature the cured molded article was removed from the molds and for reducing stresses in the material post-annealed for 3 hours at 130° C.

In this way a totally clear, transparent eyeglass blank which was free of streaks was obtained and which exhibited the optical and mechanical properties as shown in example 1. The transmission at a wavelength of 390 nm was <1%, at 400 nm 3%, at 410 nm 53% and in the range above 450 nm 92%.

The invention claimed is:

1. A method for preparing an optical lens comprising curing a composition, comprising
   A) 10 to 50 wt.-% of at least one oligomeric polyisocyanate a-1) based on hexamethylene diisocyanate, and
      50 to 90 wt.-% of at least one polyisocyanate a-2) based on isophorone diisocyanate, comprising monomeric isophorone diisocyanate and at least one oligomeric polyisocyanate based on isophorone diisocyanate, wherein, by mass, the amount of the monomeric isophorone diisocyanate is greater than the amount of the oligomeric polyisocyanate based on isophorone diisocyanate,
      wherein the %-data relate to the sum of components a-1) and a-2), and
      wherein the oligomeric polyisocyanate of a-1) is obtained by reacting only hexamethylene diisocyanate as diisocyanate unit and the oligomeric polyisocyanate of a-2) is obtained by reacting only isophorone diisocyanate as diisocyanate unit,
   B) at least one sulfur-containing component, and optionally
   C) one or more auxiliaries and/or additives.

2. The method according to claim 1, wherein the optical lens is a spectacle lens.

3. A composition, comprising A) 10 to 50 wt.-% of at least one oligomeric polyisocyanate a-1) based on hexamethylene diisocyanate, and
   50 to 90 wt.-% of at least one polyisocyanate a-2) based on isophorone diisocyanate, comprising monomeric isophorone diisocyanate and at least one oligomeric polyisocyanate based on isophorone diisocyanate, wherein, by mass, the amount of the monomeric isophorone diisocyanate is greater than the amount of the oligomeric polyisocyanate based on isophorone diisocyanate,
   wherein the %-data relate to the sum of components a-1) and a-2), and
   wherein the oligomeric polyisocyanate of a-1) is obtained by reacting only hexamethylene diisocyanate as diisocyanate unit and the oligomeric polyisocyanate of a-2) is obtained by reacting only isophorone diisocyanate as diisocyanate unit, B) at least one sulfur-containing component,
and optionally C) one or more auxiliaries and/or additives.

4. The composition according to claim 3, wherein the sulfur-containing component is selected from the group consisting of polythiols, sulfur containing hydroxy compounds, and mixtures thereof.

5. The composition according to claim 3 wherein the sulfur-containing component has a molecular weight of 78 to 1000 g/mol.

6. The composition according to claim 3, wherein the at least one auxiliary and/or additive C), is selected from the group consisting of UV-stabilizers, catalysts, antioxidants, mold release agents, dyes, and mixtures thereof.

7. A kit-of-parts comprising the following components A) and B) in separated spatial arrangement:

A) 10 to 50 wt.-% of at least one oligomeric polyisocyanate a-1) based on hexamethylene diisocyanate,
and
50 to 90 wt.-% of at least one polyisocyanate a-2) based on isophorone diisocyanate, comprising monomeric isophorone diisocyanate and at least one oligomeric polyisocyanate based on isophorone diisocyanate wherein, by mass, the amount of the monomeric isophorone diisocyanate is greater than the amount of the oligomeric polyisocyanate based on isophorone diisocyanate, wherein the %-data relate to the sum of components a-1) and a-2), and wherein the oligomeric polyisocyanate of a-1) is obtained by reacting only hexamethylene diisocyanate as diisocyanate unit and the oligomeric polyisocyanate of a-2) is obtained by reacting only isophorone diisocyanate as diisocyanate unit, B) at least one sulfur-containing component.

8. A method for preparing a polyurethane comprising curing the composition according to claim 3.

9. A method for the preparation of a transparent material comprising curing the composition according to claim 3.

10. The method according to claim 9 for preparing a transparent molded article.

11. The method according to claim 10, wherein the transparent molded article is an optical lens.

12. The method according to claim 11, wherein the optical lens is a spectacle lens.

13. Polythiourethane obtained by curing the composition according to claim 3.

14. An optical lens obtained by curing the composition according to claim 3.

15. The composition according to claim 3, wherein the polyisocyanate component a-1) contains an amount of monomeric hexamethylene diisocyanate of less than 0.5 wt.-% based on the total polyisocyanate component a-1) based on hexamethylene diisocyanate.

* * * * *